United States Patent [19]
Jaffard et al.

[11] Patent Number: 5,990,722
[45] Date of Patent: *Nov. 23, 1999

[54] SHORT CIRCUIT PROTECTION OF AN AUDIO/VIDEO DATA BUS

[75] Inventors: Jean-Luc Jaffard, Saint Egreve; Olivier Allain Jean Le Briz, Grenoble, both of France

[73] Assignee: SGS-Thomson Microelectronics S.A., Saint Genis, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/670,800

[22] Filed: Jun. 24, 1996

[30] Foreign Application Priority Data

Jun. 28, 1995 [FR] France .................. 95 07774

[51] Int. Cl.$^6$ ........................................ H02H 3/00
[52] U.S. Cl. ..................... 327/309; 327/312; 327/314; 361/56
[58] Field of Search ..................... 327/306, 309, 327/314, 530, 546, 312; 361/42, 98, 66, 56

[56] References Cited

U.S. PATENT DOCUMENTS

| | | |
|---|---|---|
| 3,573,371 | 4/1971 | Carbone, et al. .................. 370/285 |
| 5,012,129 | 4/1991 | Basten ................................ 327/482 |
| 5,258,999 | 11/1993 | Wernimont et al. ............... 375/220 |
| 5,497,284 | 3/1996 | Le ....................................... 361/42 |

OTHER PUBLICATIONS

French Search Report from French Patent Application Number 95 07774, filed Jun. 28, 1995.

*Primary Examiner*—Dinh T. Le
*Attorney, Agent, or Firm*—Wolf, Greenfield 7 Sacks, P.C.

[57] ABSTRACT

The present invention concerns a transmission circuit of an audio/video data bus that includes a clamp connected between first and second output terminals of the transmission circuit; biasing networks for respectively biasing the output terminals during one operational mode of the transmission circuit; and switched biasing networks for respectively biasing the output terminals during a second operational mode of the transmission circuit; the switched biasing networks being controlled by a digital input signal, wherein a circuit is provided for protecting the clamp from short circuit connections to the transmission circuits voltage supply rails.

26 Claims, 8 Drawing Sheets

(PRIOR ART)

SHORT CIRCUIT PROTECTION OF AN AUDIO/VIDEO DATA BUS

BACKGROUND OF THE INVENTION

1. Field of the Invention

The present invention relates to short circuit protection of a transmission circuit.

More particularly, the present invention relates to the short circuit protection of output signal clamping circuitry, within a transmission circuit, from connections to the voltage supply rails.

2. Discuss of the Related Art

In the following text, figures that illustrate various embodiments of the state of the art and/or the present invention may incorporate the same or similar elements. Therefore, where the same or similar elements occur throughout the various figures, they will be designated in the same manner.

Figure 1:
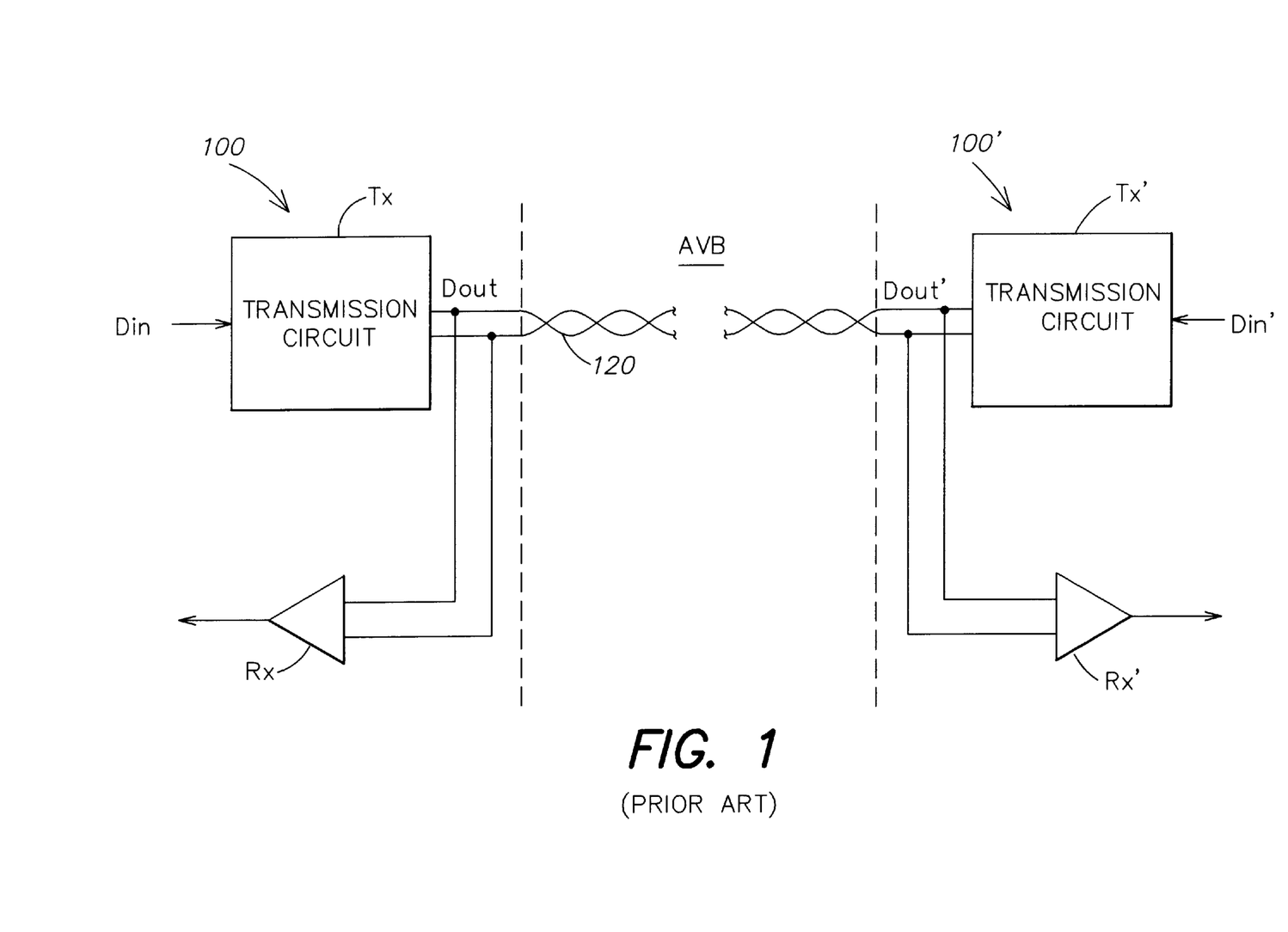
FIG. 1 is a previously described block diagram illustrating two data transceivers of an audio/video bus.

FIG. 1 represents a block diagram illustrating two data transceivers 100, 100' of an audio/video bus AVB.

Since the two illustrated transceivers 100, 100' include identical elements, only one of the transceivers will be described. Furthermore, it should be noted that the audio/video bus AVB can have approximately ten or more transceivers connected to it at any one time.

Transceiver 100 includes a transmission circuit Tx that is provided with a digital input signal Din and a receiver circuit Rx that receives transmitted data. When transceiver 100 is in transmission mode (Tx-mode) its digital input signal Din is converted into a differential digital output signal Dout for transmission via a twisted pair 120. The twisted pair provides a cheap but effective transmission medium.

A commercially available semiconductor device that incorporates such a transceiver 100 is the STV6455 AUDIO/VIDEO BUS INTERFACE which is produced by SGS-THOMSON MICROELECTRONICS.

The STV6455 is an audio and video interface device that allows easy connection and intelligent control of a plurality of the same, or similar, interface devices that share a common AVB. Such devices have to fulfill EIA/NCTA Joint Engineering Committee recommendations for connecting consumer audio and video apparatus.

Figure 2:
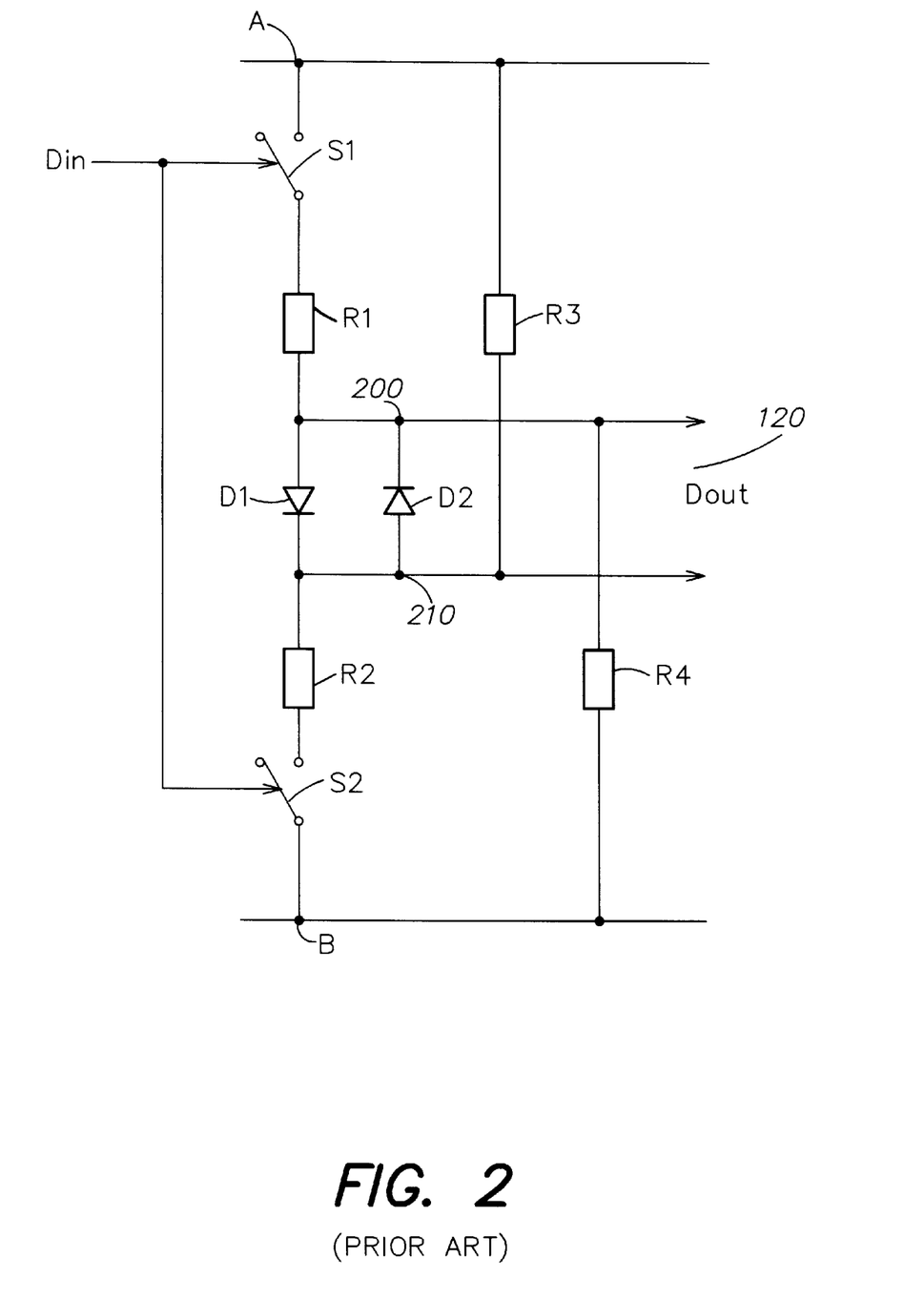
FIG. 2 is a previously described circuit diagram of transmission circuitry of FIG. 1.

FIG. 2 illustrates a circuit diagram of the transmission circuit Tx of FIG. 1.

The transmission circuit Tx includes two switches S1, S2, four resistors R1–R4 and two diodes D1, D2.

Diodes D1 and D2, are connected in opposition between the output terminals 200, 210 of the transmission circuit Tx. The respective anode and cathode terminals of diodes D1 and D2 are connected to the output terminal 200 and the respective cathode and anode terminals of diodes D1 and D2 are connected to the output terminal 210.

Diodes D1 and D2 work in opposition as a signal clamp. That is to say, diodes D1 and D2 act such that they clamp the voltage level of the signal between terminals 200 and 210 to a voltage level of +/−Vf, depending upon which one of the two diodes is conducting: Vf denotes the forward voltage drop of diodes D1 and D2 when they are conducting.

Switch S1 and resistor R1 are connected in series between a positive voltage supply rail A and the output terminal 200. Switch S2 and resistor R2 are connected in series between a negative voltage supply rail B and the output terminal 210. Switches S1 and S2 are controlled in unison by the digital input signal Din.

2

Resistor R3 is connected between the supply rail A and the output terminal 210 and resistor R4 is connected between the supply rail B and the output terminal 200.

When the transmission circuit Tx is in Tx-mode, switches S1 and S2 open and close in response to the signal Din.

By way of an example, consider the following. However, it will be necessary to make a few assumptions. Firstly, assume that switches S1 and S2 close when the digital input signal Din has a logic 1 state and that they open when the digital input signal Din has a logic 0 state: it should be understood that the inverse case could have also been assumed. Secondly, assume that R1=R2, R3=R4 and R3>R1: for a typical transmission circuit Tx, typical values of R1 and R3 are respectively 500 ohms and 15 Kohms, for a typical supply voltage (VA−VB) of 10 volts. The typical values of resistors R1–R4 and of the supply voltage (VA−VB) will be valid for the complete text of this document unless otherwise stated. Resistors R3 and R4 deliberately have substantially larger values than resistors R1 and R2 so as to avoid excessive power dissipation since, unlike resistors R1 and R2, resistors R3 and R4 permanently conduct current when the supply voltages are present. Resistors R1 and R2 only conduct current when switches S1 and S2 are closed. Therefore when the transmission circuit is not in Tx mode, switches S1 and S2 are open.

When the signal Din has a logic 1 state, i.e. when switches S1 and S2 are closed, the majority of the current flows via S1, R1, D1, R2 and S2, since this is the path of least resistance between the supply rails A and B.

Figure 3:
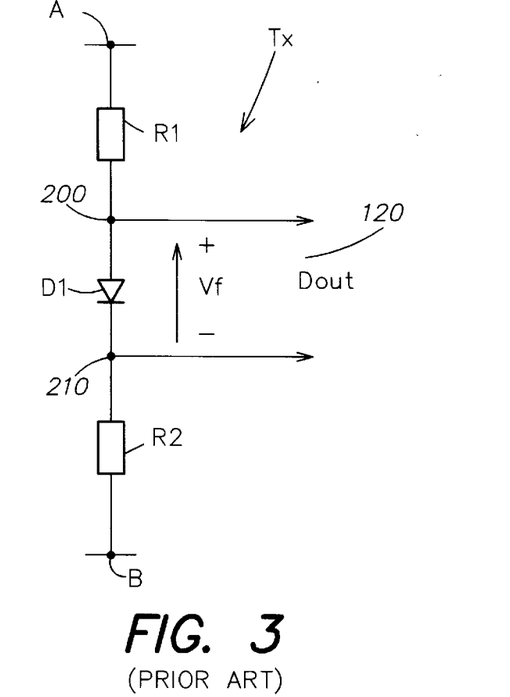
FIG. 3 is a previously described equivalent circuit diagram of the transmission circuitry of FIG. 2 when switches S1 and S2 are closed.

FIG. 3 illustrates an equivalent circuit diagram of the transmission circuit Tx when switches S1 and S2 are closed.

Diode D1 has a forward voltage drop Vf that is more positive at the output terminal 200 than at the output terminal 210, as indicated. The current flowing through diode D1 is approximately given by (VA−VB)/(R1+R2)= 10/1000=10 milliAmperes.

Referring back to FIG. 2, when the signal Din has a logic 0 state, i.e. when switches S1 and S2 are open, the current flowing between the supply rails A and B can only flow via R3, D2 and R4.

Figure 4:
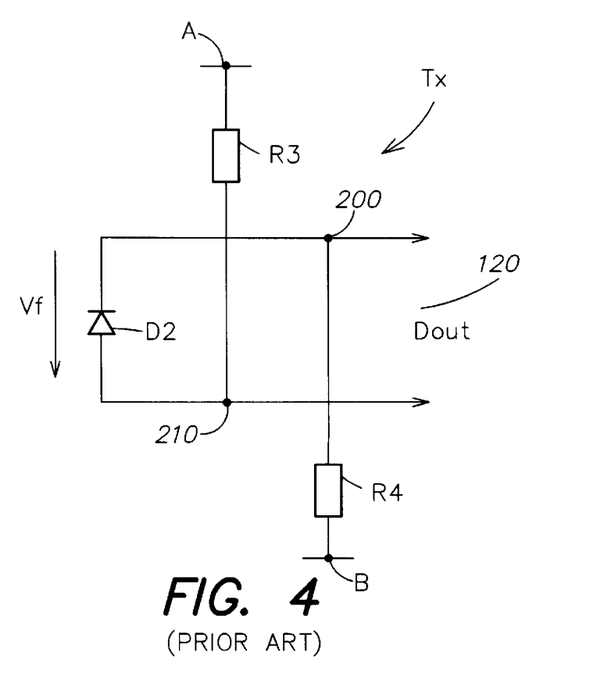
FIG. 4 is a previously described equivalent circuit diagram of the transmission circuitry of FIG. 2 when switches S1 and S2 are open.
Figure 5A:
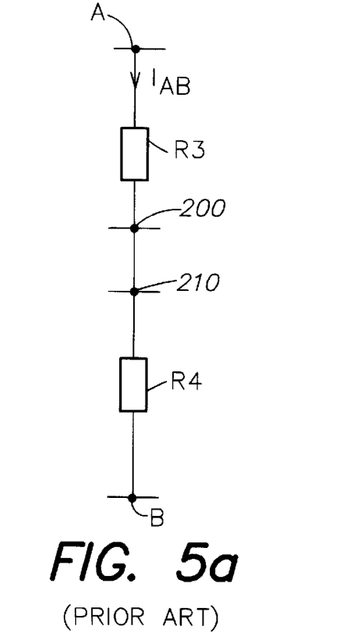
FIGS. 5a–5e are previously described circuit representations of combinations of short circuits of the transmission circuit of FIG. 3.
Figure 5B:
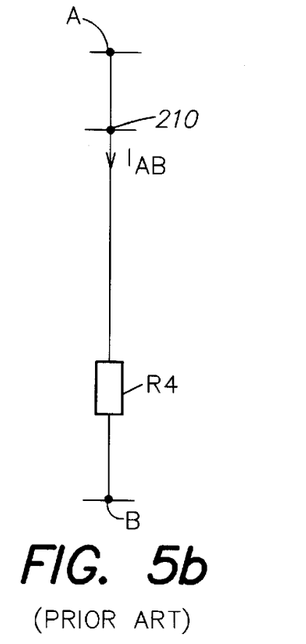
Figure 5C:
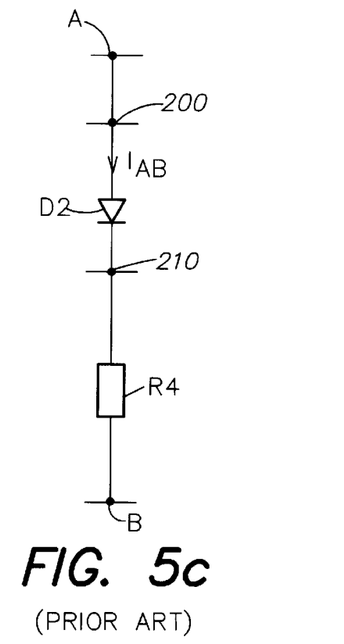
Figure 5D:
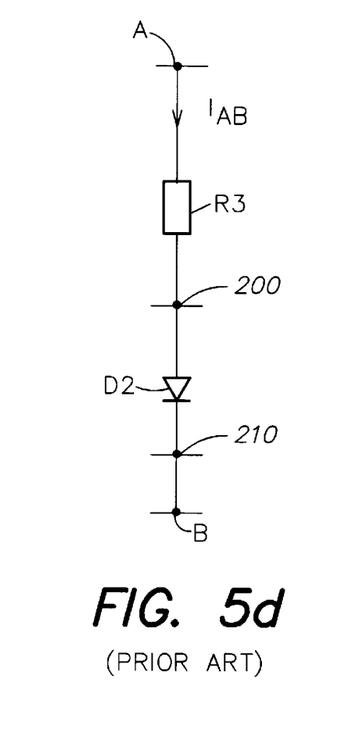
Figure 5E:
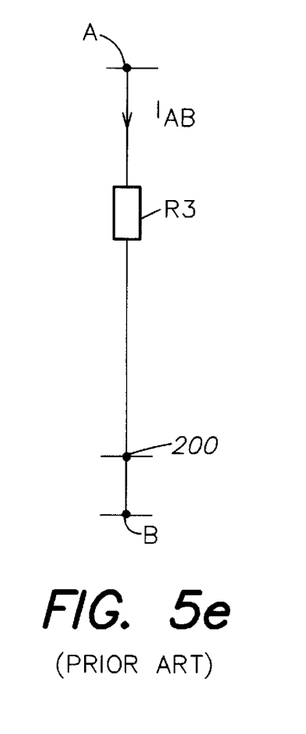
Figure 6A:
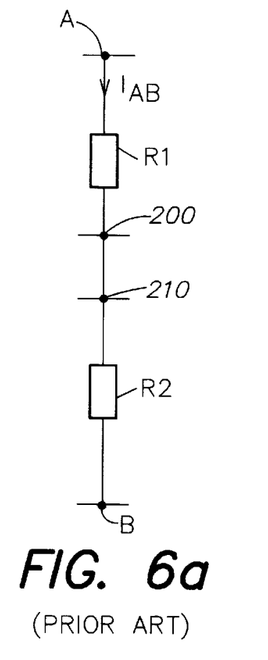
FIGS. 6a–6e are previously described approximate circuit representations of combinations of short circuits of the transmission circuit of FIG. 4.
Figure 6B:
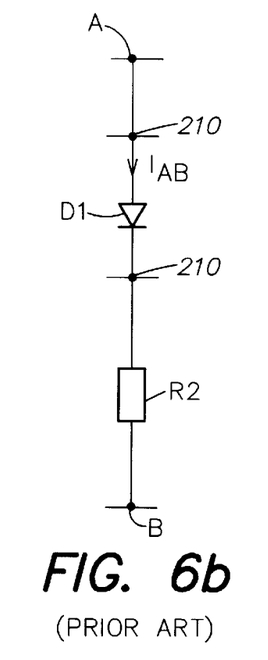
Figure 6C:
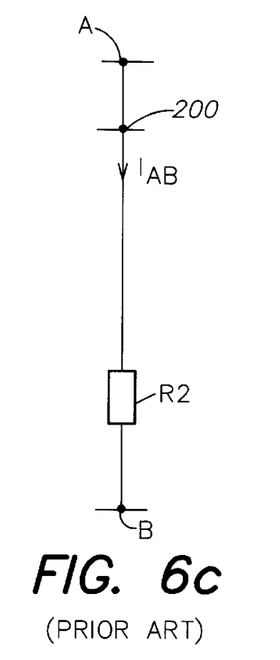
Figure 6D:
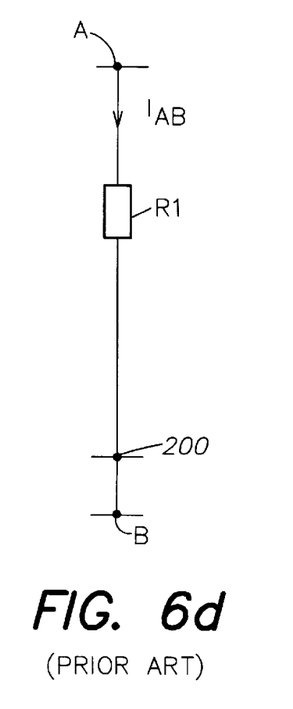
Figure 6E:
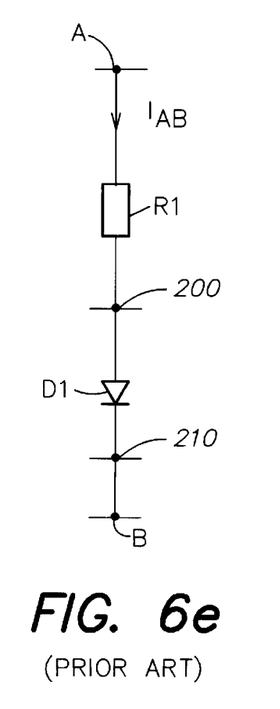

FIG. 4 illustrates an equivalent circuit diagram of the transmission circuit Tx when switches S1 and S2 are open.

Diode D2 has a forward voltage drop, also denoted Vf, that is more positive at the output terminal 210 than at the output terminal 200, as indicated. The current flowing through diode D2 is approximately given by (VA−VB)/(R3+ R4)=10/30000=0.33 milliAmperes.

Table 1, hereinafter, illustrates the approximate short circuit current values IAB, flowing from supply rail A to supply rail B, that can be tolerated by the transmission circuit Tx as a result of various combinations of short circuit connections when switches S1 and S2 are open.

Table 2, hereinafter, illustrates the approximate short circuit currents IAB that can be tolerated by the transmission circuitry Tx as a result of various combinations of short circuit connections when switches S1 and S2 are closed.

For Table 2, it should be noted that the respective resistance values of the parallel combinations of resistors R1, R3 and R2, R4 have, for reasons of simplifying the principle, been approximated to R1 and R2: this approximation is justified by the fact that the ratio R1:R3=R2:R4=30:1. It should be understood that a more accurate analysis of the currents IAB can readily be ascertained by those skilled in the art.

TABLE 1

| Short Circuit (From: To) | Current IAB (mA) | See Ref. Figure |
| --- | --- | --- |
| 200:210 | 10/30000 = 0.33 | FIG. 5a |
| 200:A | 10/15000 = 0.66 | FIG. 5b |
| 210:A | 10/15000 = 0.66 | FIG. 5c |
| 200:B | 10/15000 = 0.66 | FIG. 5d |
| 210:B | 10/15000 = 0.66 | FIG. 5e |
| (200 + 210):A | 10/15000 = 0.66 | FIG. 5b |
| (200 + 210):B | 10/15000 = 0.66 | FIG. 5e |

TABLE 2

| Short Circuit (From: To) | Current IAB (mA) | See Ref. Figure |
| --- | --- | --- |
| 200:210 | 10/1000 = 10 | FIG. 6a |
| 200:A | 10/500 = 20 | FIG. 6b |
| 210:A | 10/500 = 20 | FIG. 6c |
| 200:B | 10/500 = 20 | FIG. 6d |
| 210:B | 10/500 = 20 | FIG. 6e |
| (200 + 210):A | 10/500 = 20 | FIG. 6c |
| (200 + 210):B | 10/500 = 20 | FIG. 6e |

FIGS. 5a–5e illustrate circuit representations of the short circuit combinations of the transmission circuit Tx as set out in Table 1.

FIGS. 6a–6e illustrate approximate circuit representations of the short circuit combinations of the transmission circuit Tx as set out in Table 2.

As noted earlier, the currents IAB for the combinations of short circuits, as set out in Tables 1 and 2, can be tolerated by the transmission circuit Tx. That is to say, the transmission circuit Tx will not work correctly but, it will not suffer any adverse damage or effects due to any of the aforementioned short circuits, i.e. the transmission circuit Tx will recover from these short circuit faults. Neither would any other transceiver 100' or transceivers suffer any adverse damage or effects.

However, there are two possible short circuit conditions that are not illustrated in either of Tables 1 or 2. These two short circuit conditions are when the output terminals 200, 210 of the transmission circuit Tx are respectively connected directly to the positive and negative voltage supply rails A and B or vice-versa.

Figure 7A:
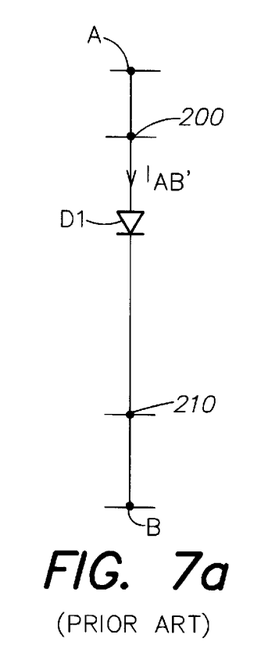
FIGS. 7a and 7b are previously described equivalent circuit diagrams of the transmission circuit of FIG. 2 when its output terminals directly connected to the voltage supply rails.

FIG. 7a illustrates the equivalent circuit diagram of the transmission circuit Tx when the output terminals 200, 210 are respectively connected directly to the positive and negative voltage supply rails A and B.

Figure 7B:
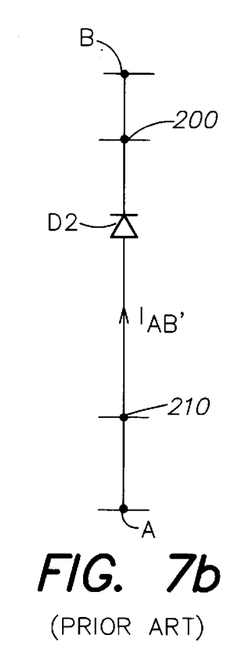

FIG. 7b illustrates the equivalent circuit diagram of the transmission circuit Tx when the output terminals 200, 210 are respectively connected directly to the negative and positive voltage supply rails B and A.

Referring to FIG. 7a, diode D1 is connected directly across the supply rails A and B such that a short circuit current IAB' flows. Since D1 is forward biased its impedance is negligible: diode D2 being reverse biased. Therefore, the current IAB' flowing through D1 will only be limited by the internal impedance of the voltage supply apparatus that is connected to the supply rails A, B. Since the internal impedance of the voltage supply apparatus will also be negligible, the current IAB' will be very large, so much so that it will completely destroy D1. The transmission circuit Tx will not recover from this particular short circuit fault. Furthermore, there is also the possibility that such a short circuit will affect the other parts of the transceiver 100 and/or other transceivers 100' that are connected to the bus AVB.

Referring to FIG. 7b, this case is exactly the same as that referred to in relation to FIG. 7a, except that in this case, it is diode D2 that is connected directly across the supply rails A and B: diode D1 being reverse biased.

In a best case scenario, either of the short circuit faults associated with FIGS. 7a and 7b will produce a serious problem for the transmission circuit Tx that develops the fault. And in a worse case scenario, either of these short circuit faults will produce a serious problem for all of the other transceivers (100') connected to the AVB.

Such scenarios are best avoided. Accordingly, it is an object of the present invention to overcome these short circuit problems.

Another object of the present invention is to provide a fully recoverable arrangement for overcoming these short circuit problems.

Other objects of the present invention include providing simple, cost effective, and integratable arrangements for overcoming these short circuit problems.

SUMMARY OF THE INVENTION

In order to achieve these objects, the present invention proposes a transmission circuit that comprises an input terminal for receiving a digital input signal and first and second output terminals for providing differential output signals; clamping means, connected between the first and second output terminals, for clamping the levels of the differential output signals; a first resistive element connected between a first voltage supply rail and the second output terminal; a second resistive element connected between a second voltage supply rail and the first output terminal; third resistive element and first switching element that are series connected between the second output terminal and the second voltage supply rail; a fourth resistive element and second switching element that are series connected between the first output terminal and the first voltage supply rail; the first and second switching elements being controlled by the digital input signal; and means for protecting the clamping means from short circuit connections directly to the first and second voltage supply rails.

According to another embodiment of the present invention, the clamping means comprises first and second uni-directional conduction means that are connected in opposition, the first uni-directional conduction means being connected such that when it is conducting it allows current to flow from the first output terminal to the second output terminal and the second uni-directional conduction means being connected such that when it is conducting it allows current to flow from the second output terminal to the first output terminal.

According to another embodiment of the present invention, the means for protecting the clamping means comprises: a means for monitoring the voltage difference between the first and second uni-directional conduction means; and third and fourth switching elements that are controlled by the monitoring means, respectively connected in series with the first and second uni-directional conduction means; at least the third switching element being open-circuited when the voltage on the first output terminal, with respect to the voltage on the second output terminal, exceeds a predetermined threshold voltage; at least the fourth switching element being open circuited when the voltage on the second output terminal, with respect to the voltage on the first output terminal, exceeds a predetermined threshold voltage.

According to another embodiment of the present invention, the means for protecting the clamping means comprises: a means for monitoring the voltage difference between the first and second uni-directional conduction means; a fifth switching element, that is controlled by the monitoring means, connected in series with the first uni-directional conduction means, the fifth switching element being open-circuited when the voltage on the first output terminal, with respect to the voltage on the second output terminal, exceeds a predetermined threshold voltage; and at least one resistive element connected in series with the second uni-directional conduction means.

According to another embodiment of the present invention, the fifth switching element is operatively connected between two terminals of the diode connected transistor and is controlled by the monitoring means such that the fifth switching element is open-circuited when the voltage on the first output terminal, with respect to the voltage on the second output terminal, exceeds a predetermined threshold voltage.

According to other embodiments of the present invention, the first and second uni-directional conduction means are diodes, where either one of them or both of them are diode connected transistors. Any of the switching elements can be implemented by bipolar and/or MOSFET transistors. The diode connected transistor or transistors being n-type or p-type transistors that are implemented in a bipolar technology and/or a MOSFET technology.

According to another embodiment of the present invention, the transmission circuit is monolithically integrated on a semiconductor substrate.

BRIEF DESCRIPTION OF THE DRAWINGS

These and other objects, as well as other advantages and features, of the present invention will become apparent in light of the following detailed description and accompanying drawings among which.

DETAILED DESCRIPTION

Figure 8:
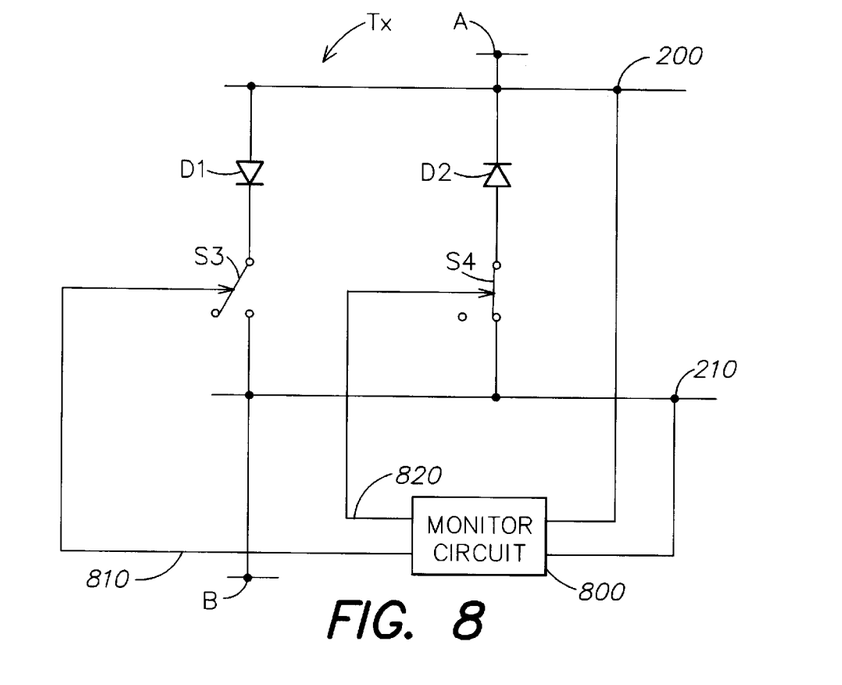
FIGS. 8 and 9 are equivalent circuit diagrams of embodiments of the transmission circuit of FIG. 2, according to the present invention, when its output terminals are connected directly to the voltage supply rails.

FIG. 8 illustrates an equivalent circuit diagram of an embodiment of the transmission circuit Tx, according to the present invention, when its output terminals 200, 210 are respectively connected directly to the positive and negative voltage supply rails A and B.

Included in FIG. 8 is circuitry, according to the present invention, for protecting the clamping diodes D1 and D2 from respective short circuit connections of the output terminals 200 and 210 to the positive and negative voltage supply rails A and B. It comprises a protection circuitry for protecting the clamping diodes D1 and D2.

This protection circuitry includes: two switches S3 and S4 that are respectively connected in series with the diodes D1 and D2; and circuitry 800 that monitors the voltages at the output terminals 200, 210 and that controls, i.e. opens and closes, the switches S3 and S4.

This monitoring circuitry 800 can for example be a comparator. The operation of the monitoring circuitry 800 is such that, when the output terminals 200 and 210 are respectively connected to the positive and negative voltage supply rails A and B, it controls, at least switch S3, so that it opens. Thus, when S3 is open, the short circuit current IAB' can no longer flow via the clamping diode D1. Therefore, diode D1 and the transmission circuit Tx are both protected.

The actual voltage difference DV between the output terminals 200, 210 above which the monitoring circuitry 800 opens switch S3, i.e. DV open, can be set at any value above approximately 2 Vf. However, it is preferable to set DV open somewhere between approximately 3 Vf and 1 volt. An advantage of setting the value of DV open between 3 Vf and 1 volt, for example, is that the monitoring circuitry 800 can quickly respond to the direct supply short circuits and it can also quickly respond to other indirect short circuit situations that would tend to alter the normal bias voltages of the output terminals 200, 210.

The actual voltage difference DV between the output terminals 200, 210 at which the monitoring circuitry closes switch S3, i.e. DV close, can be set at a value equal to or less than DV open. Or to put it in other words, it is possible to introduce some hysterisis into the monitoring circuitry 800 for opening and closing S3.

The voltage difference DV will fall below DV close when the short circuit is removed and the transmission circuit can therefore continue to operate for the purpose for which it was intended.

The monitoring circuitry 800 can, as illustrated, have two outputs 810 and 820 that respectively control switches S3 and S4. It is possible that rather than the monitoring circuitry 800 just opening switch S3 when DV exceeds its predetermined threshold, i.e. DV open, it could also control, i.e. open, switch S4.

Also, it is possible that the monitoring circuitry 800 can have just one output terminal that would control switches S3 and S4 in unison. An advantage of opening switch S4 in addition to S3 is that there would be none of the problems associated with stressing diode D2 with a reverse bias voltage.

Furthermore, it is possible that there could be two monitoring circuits or comparators that monitor or compare the voltages at one of the output terminals with a suitable reference voltage.

Figure 9:
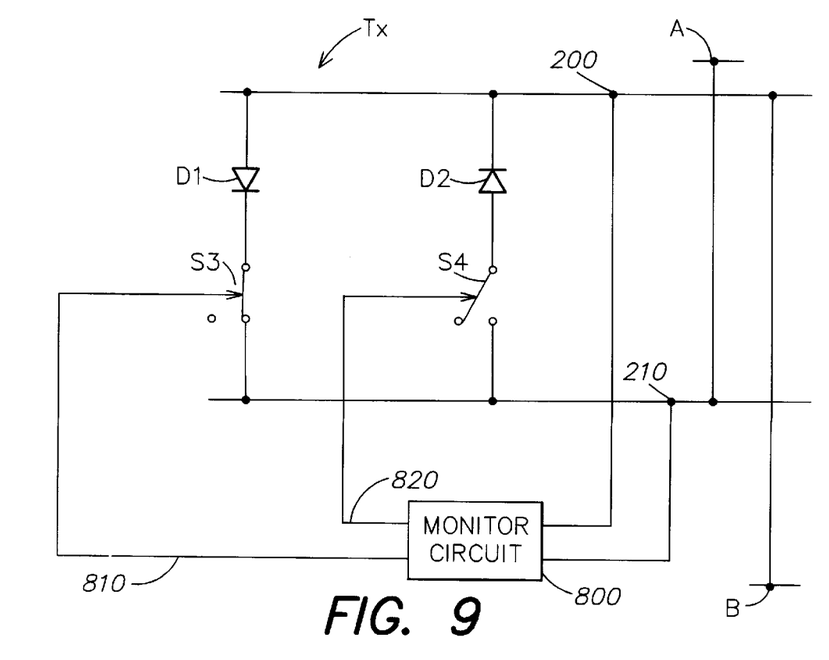

FIG. 9 illustrates the same embodiment as that illustrated in FIG. 8. However, in FIG. 9 the output terminals 200, 210 of the transmission circuit Tx are respectively connected directly to the negative and positive voltage supply rails B and A.

The above description for FIG. 8 is valid for that of FIG. 9 except that it is at least diode D2 that must be protected. Therefore, in order to avoid repetition, reference can be made to the above, while at the same time interchanging the relevant references.

Figure 10:
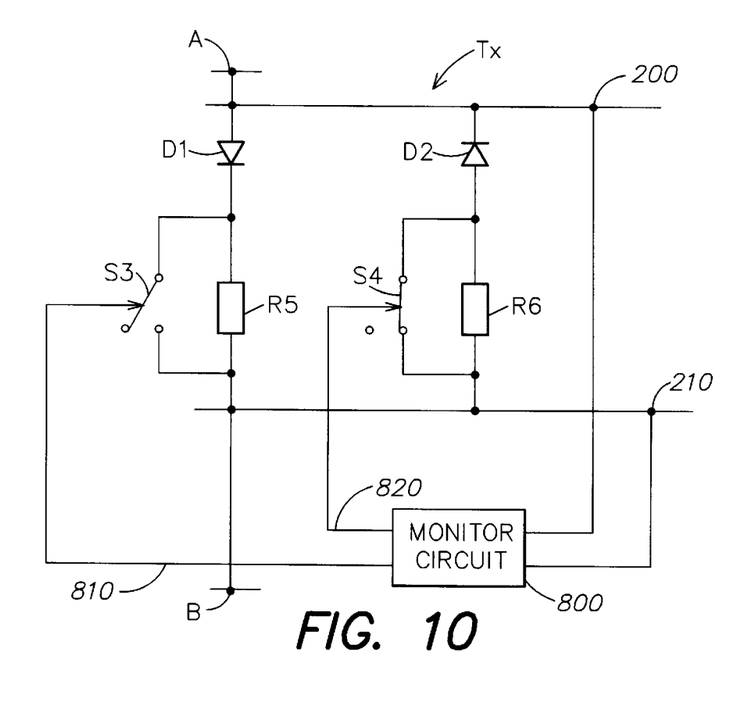
FIG. 10 is an equivalent circuit diagram of another embodiment of the transmission circuit of FIG. 2, according to the present invention, when its output terminals are connected directly to the positive and negative voltage supply rails.

FIG. 10 illustrates an equivalent circuit diagram of another embodiment of the transmission circuit Tx, according to the present invention, when its output terminals 200, 210 are respectively connected directly to the positive and negative voltage supply rails A and B.

This particular figure includes the same elements and operates in the same manner as FIG. 8. However, FIG. 10 also includes two resistors R5 and R6 that are respectively connected in parallel with switches S3 and S4.

Therefore, rather than switch S3 completely isolating diode D1 from one of the output terminals, and hence one of the supply terminals, switch S3 opens such that resistor R5 is no longer short circuited. Thus, the value of R5 can be chosen such that the current flowing through D1 does not exceed the forward current rating of D1. For example, R5 can have a value from approximately 200 ohms, which for a 10 volt supply would cause a current of approximately 50 milliAmperes to flow through D1. If the value of R5 was chosen to be 15 Kohms, then a current of approximately 0.66 milliAmperes would flow through D1. It should be noted that it does not really matter what the value of R5 is, provided of course that the current through D1 does not exceed the forward current rating, because during the normal operation of the transmission circuit R5 will be short circuited.

The same principle applies to R6 when the output terminals 200, 210 are respectively connected directly to the negative and positive voltage supply rails B and A and when switch S4 is opened.

Alternatively, (although not illustrated) D1 and/or D2 could have resistors placed in series with both their respective anode and cathode terminals: these additional resistors of course being placed in parallel with additional suitably controlled switches.

Again the above description for FIG. 8 is valid for that of FIG. 10 in both permutations where the output terminals 200, 210 are directly connected to the supply rails.

Figure 11:
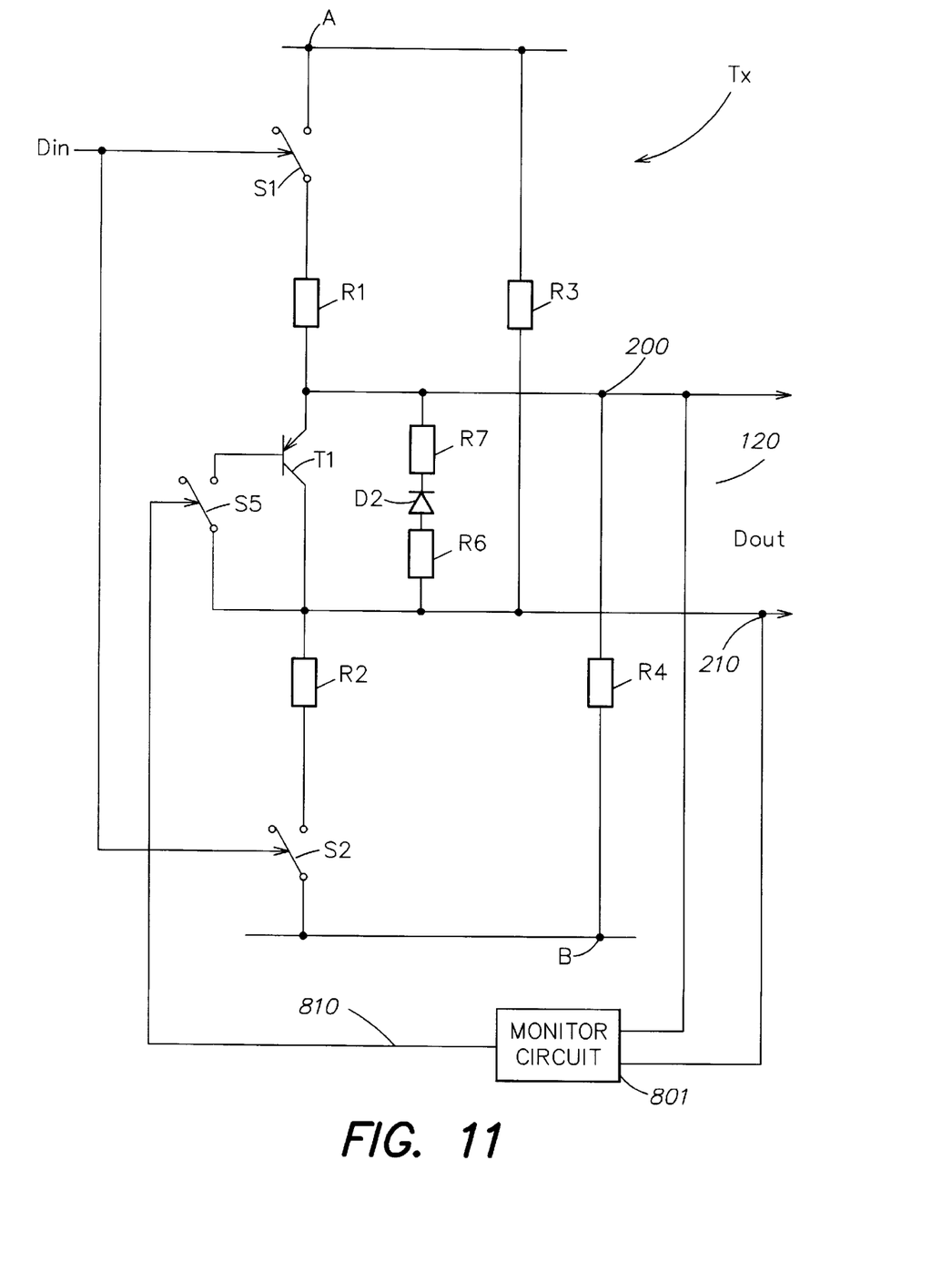
FIG. 11 is a circuit diagram of a preferred embodiment of the transmission circuit of FIG. 2, according to the present invention.

FIG. 11 illustrates a circuit diagram of a transmission circuit Tx according to a preferred embodiment of the present invention.

This transmission circuit Tx includes three switches S1, S2, S5, six resistors R1–R4, R6, R7, a diode D2, a p-type bipolar transistor T1 and monitoring circuitry 801.

Diode D2, resistors R1–R4 and switches S1 and S2 are connected as described above in relation to FIG. 2.

Resistor R6 is illustrated as being connected between the anode of D2 and terminal 210 and resistor R7 is illustrated as being connected between the cathode of D2 and terminal 200. Alternatively, one of the resistors could be suppressed while preferably increasing the value of the other. However, the inventor found that by having two matched resistors the biasing of the terminals 200 and 210 was balanced, which is preferable.

Diode D1 of FIG. 2 has, in this preferred embodiment and in accordance with the present invention, been replaced by the transistor T1. The emitter and collector terminals of T1 are respectively connected to the output terminals 200 and 210. The base terminal of T1 is connected to one side of switch S5, the other side of switch S5 being connected to the output terminal 210.

When switch S5 is closed transistor T1 acts as a diode connected transistor that performs the same function as diode D1. Furthermore, it is possible, and preferable in an integrated circuit solution, to implement diode D2 using a p-type transistor (not illustrated): an advantage of this would be that during the normal operation of the transmission circuit Tx the forward voltage drops between the output terminals 200, 210 could be made to be substantially identical.

The monitoring circuitry 801 of this current figure is connected and operates as described above in relation to the monitoring circuitry 800 of FIG. 8. It should be understood that the monitoring circuitry 801 of this particular figure only differs from the monitoring circuitry 800 of FIG. 8 in that it has one output control terminal 810 that controls switch S5.

The condition when S5 is required to open is when the voltage developed on terminal 200, with respect to terminal 210, becomes greater than DV open.

When S5 is open, it disconnects the base and collector terminals of T1. Therefore, T1 no longer acts as a diode connected transistor, but instead, it develops a very large impedance between its emitter and collector terminals, i.e. the respective output terminals 200 and 210. Therefore, no current flows from terminal 200 to terminal 210 since T1 and D2 present high impedance's between terminals 200 and 210: D2 being of course reverse biased. It should be understood that the emitter-collector breakdown voltage of T1, that has an open-circuit, i.e. flying, base terminal, must be greater than VA–VB so as to avoid any possible conduction between terminal 200 and 210.

Once the monitoring circuitry 801 detects a voltage difference DV less than or equal to the value of DV open it controls switch S5 such that S5 closes.

In the case where the voltage developed on terminal 210, with respect to terminal 200, becomes positive, the monitoring circuit 801 does not have to open switch S5: however, it is possible that it can open S5. Whether or not S5 is opened or not, in this particular case it is resistors R6 and R7 that limit the amount of current flowing from terminal 210 to 200.

The values of R6 and R7 can be approximately in the range of 100–1000 ohms. The actual values chosen for R6 and R7 is dependant upon two factors.

The first factor is the amount of current that diode D2 can tolerate for an infinite short circuit condition.

The second factor is more subtle. The inventor found that the need for a switch could be avoided by placing at least one resistor in series with diode D2 and between terminals 200 and 210 that has an appropriate value. The rationale behind this avoidance, the inventor discovered, is that during the normal operation of the transmission circuit Tx when switches S1 and S2 are open, the current IAB flows through the two large value resistors R3 and R4, that have typical values of 15 Kohms,. Therefore, the introduction of one or more resistors that have, in comparison to resistors R3 and R4, low values, will not adversely affect the normal operation of the transmission circuit Tx. Yet, these one or more resistors can have a total resistance value that limits the short circuit current IAB' and thus protect the integrity of the diode D2 and thus the transmission circuit Tx. The resitors R3 and R4 are another way to protect the clamping means.

The monitoring circuitries 800 and 801 are of a known type. For example they comprise differential amplifiers or comparators of which the switch over threshold may be set. For an hysterisis mode it is advised to provide two such differential amplifiers and a logic gates set. The switches S1–S5 are preferably MOSFETs.

Some advantages of having a resistor, or preferably balanced resistors R6, R7, as opposed to a switch, include: reduced complexity, reduced cost, increased reliability and in the case of an integrated solution a smaller die area can be included.

Although this invention has been described in connection with certain preferred embodiments, it should be understood that the present disclosure is to be considered as an exemplification of the principles of the invention and that there is no intention of limiting the invention to the disclosed embodiments. On the contrary, it is intended that all alternatives, modifications and equivalent arrangements as may be included within the spirit and scope of the appended claims be covered as part of this invention.

Many other alternative embodiments of the present invention will become apparent to those skilled in the art. For example, the bipolar transistor TI can be replaced by a field effect transistor, more elaborate switching arrangements can be thought up and the monitoring circuitry 801 can be implemented using a variety of comparator type solutions. However, as stated earlier, such alternative arrangements and embodiments are intended to be covered by the scope and spirit of the present invention.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A transmission circuit having an input terminal for receiving a digital input signal and first and second output terminals for providing first and second differential output signals, the transmission circuit comprising:

a clamping means including first and second switches, connected between the first and second output terminals for clamping the first and second differential output signals;

a first resistive element connected between a first voltage supply rail and the second output terminal;

a second resistive element connected between a second voltage supply rail and the first output terminal;

a series connected third resistive element and third switching element that are connected between the second output terminal and the second voltage supply rail;

a series connected fourth resistive element and fourth switching element that are connected between the first output terminal and the first voltage supply rail;

the first and second switching elements being controlled by the digital input signal; and means connected between the first and second output terminals for protecting the clamping means from short circuit connections to the first and second voltage supply rails by opening at least one of the first and second switches when the means for protecting detects short circuit connections to the first and second voltage supply rails.

2. A transmission circuit according to claim 1, wherein the clamping means comprises:

in a first uni-directional conduction means connected between the first output terminal and the second output terminal, the first uni-directional conduction means connected such that when the first uni-directional conduction means is conducting current flows from the first output terminal to the second output terminal and a second uni-directional conduction means connected between the first output terminal and the second output terminal, the second uni-directional conduction means connected such that when the second uni-directional conduction means is conducting current flows from the second output terminal to the first output terminal.

3. A transmission circuit according to claim 2, wherein the means for protecting the clamping means monitors a voltage difference between the first and second output terminals, the voltage difference defining a voltage on the first output terminal taken with respect to the second Output terminal and defining a voltage on the second output terminal taken with respect to the first output terminal, wherein the first and second switching elements are controlled by the monitoring means, the first and second switching elements respectively connected in series with the first and second uni-directional conduction means;

at least the first switching element being open-circuited when the voltage on the first output terminal taken with respect to the second output terminal exceeds a predetermined positive threshold;

at least the second switching element being open circuited when the voltage on the second output terminal taken with respect to the output terminal exceeds a predetermined positive threshold.

4. A transmission circuit according to claim 2, wherein the means for protecting the clamping means comprises:

means for monitoring the voltage difference between the first and second uni-directional conduction means;

a protection switching element that is controlled by the monitoring means, connected in series with the first uni-directional conduction means, the protection switching element being open-circuited when the voltage on the first output terminal taken with respect to the second output terminal exceeds a predetermined positive threshold; and at least one resistive element connected in series with the second uni-directional conduction means.

5. A transmission circuit according to any one of the claims 2–4, wherein the first and second uni-directional conduction means are diodes.

6. A transmission circuit according to claim 4, wherein the first uni-directional conduction means is a diode connected transistor and the second uni-directional conduction means is a diode.

7. A transmission circuit according to claim 6, wherein the diode is a diode connected transistor.

8. A transmission circuit according to claim 6, wherein the diode connected transistor is a p-type transistor.

9. A transmission circuit according to claim 7, wherein the diode connected transistors are p-type transistors.

10. A transmission circuit according to claim 6, wherein the protection switching element (S5) is connected between two terminals of the diode connected transistor and is controlled by the monitoring means such that the protection switching element is open-circuited when the voltage on the first output terminal with respect to the voltage on the second output terminal exceeds a predetermined positive threshold.

11. A transmission circuit according to claim 10, wherein the diode is a diode connected transistor.

12. A transmission circuit according to claim 10, wherein the diode connected transistor is a p-type transistor.

13. A transmission circuit according to claim 11, wherein the diode connected transistors are p-type transistor.

14. A transmission circuit according to any one of claims 1–4, the transmission circuit monolithically integrated on a semiconductor substrate.

15. A transmission circuit according to any one of claims 1–4, in which the digital input signal is an audio/video signal.

16. A method for providing supply voltage short circuit protection in a transmission circuit having two output lines, comprising the steps of:

clamping the two output lines at a predetermined voltage by using a switched clamping means;

monitoring a voltage difference between the two output lines; and open circuiting the switched clamping means when the monitored voltage difference exceeds the predetermined voltage by a predetermined amount.

17. The method of claim 16, further comprising the step of:

limiting a clamping current flowing through a clamp connected between the two output lines during the step of clamping.

18. The method of claim 17, wherein the step of limiting further comprises:

open circuiting the connection of the clamp through which a clamping current flows.

19. The method of claim 17, wherein the step of limiting further comprises:

including in the clamp a resistive circuit element through which a clamping current flows.

20. A transmission circuit having an input terminal for receiving a digital input signal and first and second output terminals for providing first and second differential output signals, comprising:

clamping means including first and second switch elements, connected between the first and second output terminals for clamping levels of the first and second differential output signals;

means for monitoring a voltage between the first and second output terminals; and means for disconnecting the clamping means from one of the first and second output terminals by opening at least one of the first and second switch elements when the voltage monitored by the means for monitoring exceeds a predetermined threshold to protect the clamping means from a short circuit.

21. The transmission circuit of claim 20, wherein the clamping means further comprises:

two means for unidirectional conduction;

the two means for unidirectional conduction connected in parallel and oriented for conduction in opposite directions.

22. The transmission circuit of claim 21, wherein the means for disconnecting further comprises:

switch means for selectively connecting and disconnecting one of the two means for unidirectional conduction from one of the first and second output terminals.

23. The transmission circuit of claim 21, wherein the means for disconnecting further comprises:

means for electrically altering one of the two means for unidirectional conduction to form an open circuit.

24. A protection device for a transmission circuit having first and second output terminals, comprising:

a bidirectional diode clamping circuit including a switch circuit, connected between the first and second output terminals; and a comparator circuit connected to compare a voltage between the first and second output terminals to a predetermined threshold and producing a control output; wherein the control output controls the switch circuit to disconnect one direction of the bidirectional diode clamp from one of the first and second output terminals to protect the bidirectional diode clamping circuit from a short circuit.

25. The protection device of claim 24, wherein the bidirectional diode clamp includes a diode and the switching circuit includes a switch connected in series with the diode, responsive to the control output.

26. The transmission circuit of claim 24, wherein the bidirectional diode clamp includes a transistor and the switching circuit includes a switch connected between a control terminal and an output terminal of the transistor for selectively causing the transistor to open circuit and to form a diode, responsive to the control output.

* * * * *